Sept. 26, 1939.    J. LEVIN    2,174,469
GLASS-CUTTING GUIDE
Filed Sept. 2, 1938    2 Sheets-Sheet 1
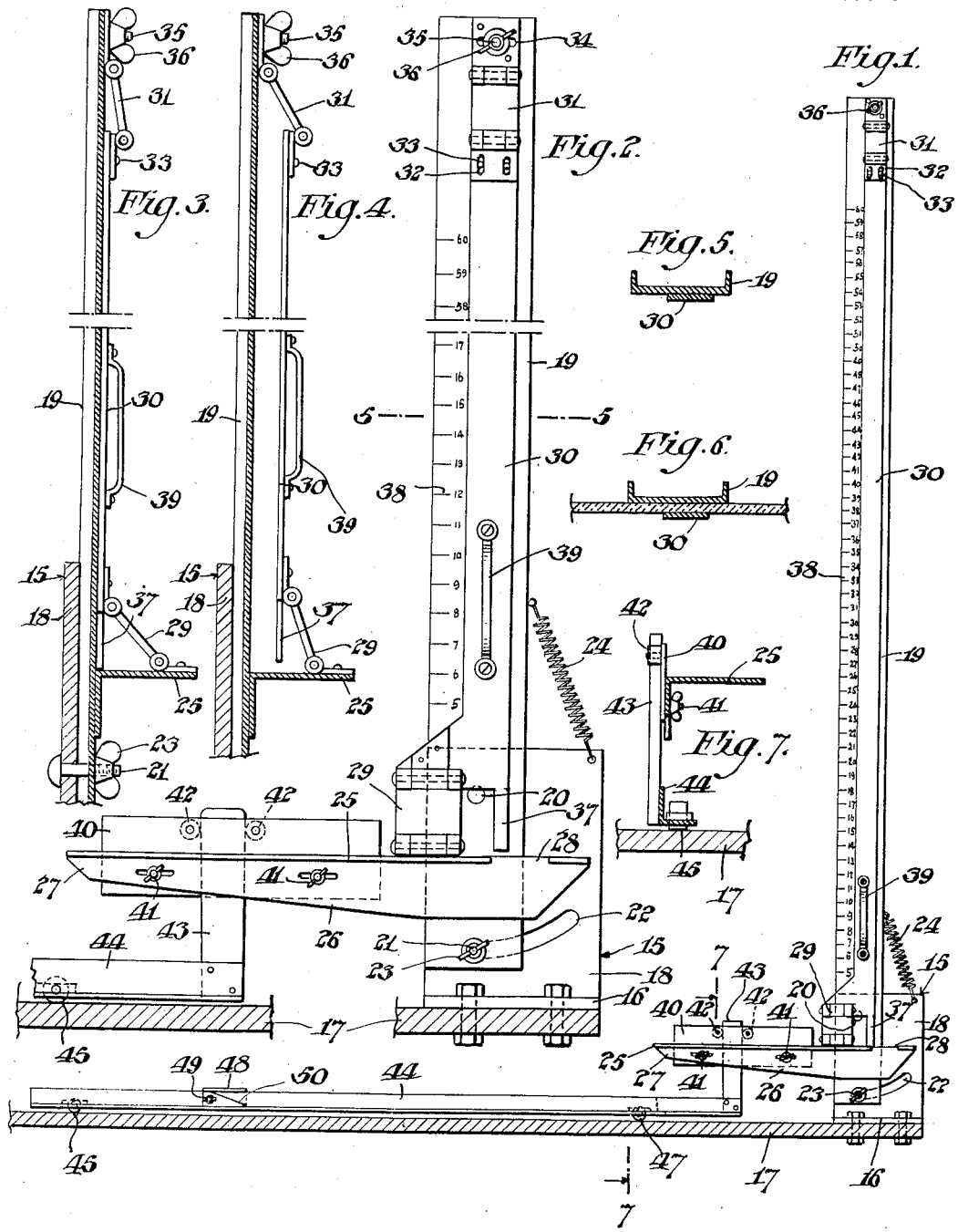
Inventor:
Joseph Levin,
By W. W. Williamson
Attorney.

Sept. 26, 1939.    J. LEVIN    2,174,469
GLASS-CUTTING GUIDE
Filed Sept. 2, 1938    2 Sheets-Sheet 2
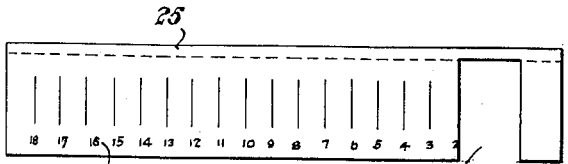
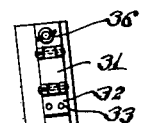
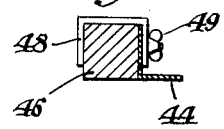
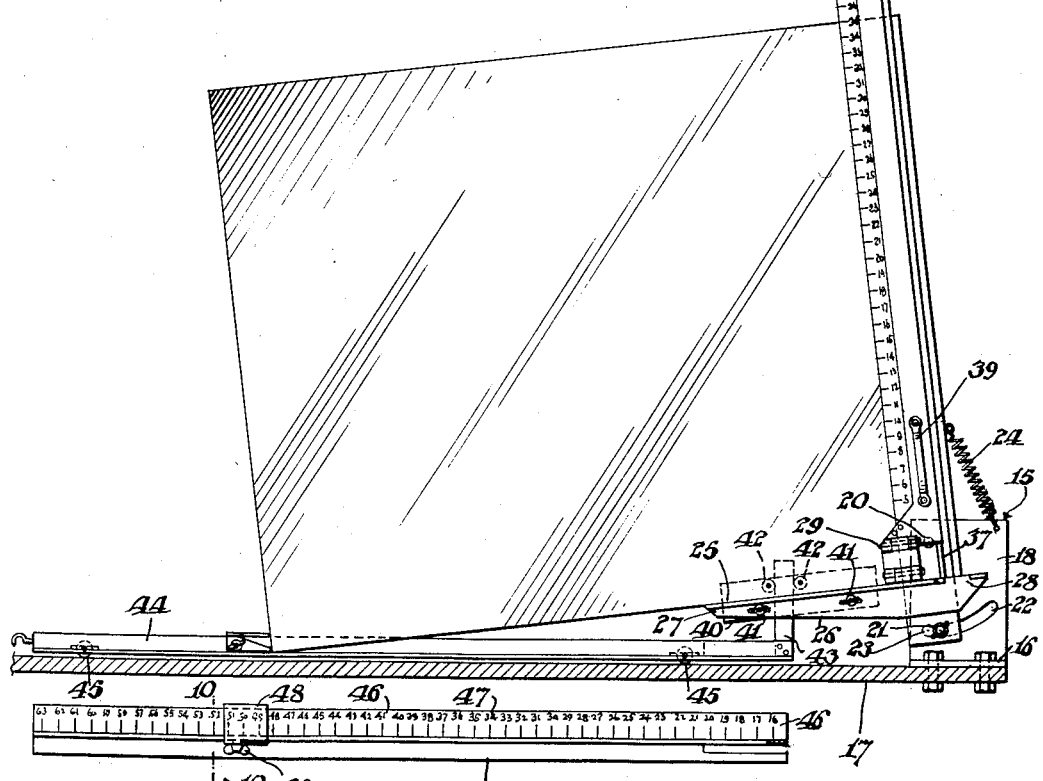
Inventor:
Joseph Levin,
By W. W. Williamson
Attorney.

Patented Sept. 26, 1939

2,174,469

UNITED STATES PATENT OFFICE 2,174,469

GLASS-CUTTING GUIDE

Joseph Levin, Philadelphia, Pa.

Application September 2, 1938, Serial No. 228,124

6 Claims. (Cl. 33—76)

My invention relates to a new and useful glass cutting guide and has for one of its objects the provision of means for measuring a sheet or light of glass relative to a straightedge, so that when cut said sheet of glass will be of the proper dimension.

Another object of the invention is to provide a straightedge connected to a tilting upright pivoted on a bracket, said upright being urged towards and normally maintained in a perpendicular location and having means to hold it in various adjusted positions.

Another object of this invention is to attach a base or rest to the upright on which the lower edge of the glass rests when in place to be cut said base moving in unison with the upright to maintain the right angle relation between the straightedge and rest.

Another object of this invention is to connect a movable measuring element to the rest or base so that it will move to and fro as the upright is tilted, to position the measuring element in proper relation to the straightedge for predetermining the line on which the glass is to be cut, said measuring element carrying an adjustable stop.

A further object of the invention is to provide an efficient glass holder for supporting a sheet of glass in proper position while being cut along a predetermined line and the excess broken off.

A still further object of this invention is to provide an exceedingly simply and effective means for adjusting the straightedge should it accidentally get out of alignment.

With the above and other objects in view, this invention consists of the details of construction and combination of elements hereinafter set forth and then designated by the claims.

In order that those skilled in the art to which this invention appertains may understand how to make and use the same, I will describe its construction in detail, referring by numerals to the accompanying drawings in which:—

Fig. 1 is front elevation of the glass cutting guide with the parts in positions assumed when not in use.

Fig. 2 is an enlarged fragmentary front view thereof.

Fig. 3 is a longitudinal or vertical section through the upright with the straightedge in a closed position.

Fig. 4 is a similar view showing the straightedge open to receive a sheet of glass.

Fig. 5 is a cross-sectional view on the line 5—5 of Fig. 2 with the straightedge lying flat against the upright.

Fig. 6 is a similar view showing a sheet of glass between the upright and straightedge.

Fig. 7 is an enlarged sectional view on the line 7—7 of Fig. 1.

Fig. 8 is a front elevation of the apparatus illustrating a sheet of glass in position to be cut a predetermined size.

Fig. 9 is a top plan view of the horizontal arm 10 and rule.

Fig. 10 is an enlarged section on the line 10—10 of Fig. 9.

Fig. 11 is an enlarged top plan view of the rest or base.

In carrying out my invention as herein embodied 15 represents an angle bracket or corner iron, one leg 16 of which is suitably fastened to a support 17, such as a table or counter, while the other leg 18 projects upwardly. An upright 19 in the form of a channel iron is pivoted adjacent its lower end, as at 20, to the upper portion of the leg 18 so that the upright may swing from side to side. In order to hold the upright in various adjusted positions, a bolt 21 projects through a slot 22 in the leg 18 of the angle iron and through the wall of said upright with a wing nut 23 screwed on to the bolt. Said bolt and slot also limit the swinging movements of the upright, which is normally held in a perpendicular position by a spring 24 having one end attached to the leg 18 and the other end attached to said upright.

An angular base or rest 25 is fixed to the outer surface of the web of the channel upright and the vertical leg of said base or rest is beveled on an obtuse angle as indicated at 26 from a point adjacent the upright to a point near the outer free end of the base where the edge is then beveled at an acute angle as indicated at 27 for a purpose to be presently described. The horizontal leg of said base or rest has an opening 28 cut in it of sufficient size to permit the passage of an operator's hand and therefore said opening is located contiguous the upright. It is to be understood that said base or rest, being permanently attached to the upright, moves with the latter at all times.

One leaf of a double-acting or three leaf hinge is attached to the horizontal leg of the base or rest 25 to one side of the opening 28, while another leaf of said hinge is attached to an offset portion at the lower end of the straightedge 30, while on the upright end of said straightedge is slidably attached one leaf of a double acting hinge 31. As shown, the hinge leaf which is attached to the straightedge has longitudinal slots 32 which register with headed pins or rivets 33. The outer leaf of the hinge 31 has a transverse slot 34 which registers with a threaded stud 35 having a wing nut 36 screwed thereon. This permits lateral adjustment of the upper end of the straightedge should the same get out of alignment and become other than at right angles to the base or rest 25. Projecting from the lower end of the main body portion of the straightedge to the top or horizontal leg of the base or rest 25 is an extension 37 that permits the glasscutter to be guided entirely to the lower edge of the sheet of glass being cut and the height of said sheet of glass is readily ascertainable due to the scale 38 on the face of the upright adjacent the straightedge and the latter is movable by means of a suitable handle 39 mounted thereon adjacent the lower end.

On the back of the vertical leg of the rest 25 is mounted a plate 40 by means of fastening devices 41 which pass through slots in one of the elements to permit longitudinal adjustment of the plate 40 relative to the rest. Said plate 40 has a pair of spaced rollers 42 mounted on the back thereof preferably adjacent its upper edge and between these rollers operates the vertical post 43 one or both side edges of which taper towards their lower ends in order to permit the rollers to assume various positions relative to the post without binding on the same. This post is carried by one end of the travelling base 44, preferably formed from an angle iron, and mounted on rollers 45 which engage the support 17. On the back of the upright leg of the travelling base 44 is mounted a wooden bar 46, or other equivalent thereof, with a scale 47 delineated on the top surface thereof. The scales are of linear measurements, such as inches.

A stop 48, which may be an inverted U-shaped device embracing the wooden bar 46 and the upright leg of the travelling base with a wing bolt 49 threaded through one of the legs of the stop impinges on the surface of said travelling base to hold it in various adjustments. That leg of the stop 48 which is in front of the upright leg of the travelling base is cut away as indicated at 50 to provide a relatively small abutment and remove the material which would otherwise interfere with the proper setting of the sheet of glass.

When the device is being used for cutting sheets of glass of a length not longer than the rest 25, the measurements thereof are determined by the scale 51 on the upper face of said rest, but when cutting a sheet of glass of a length greater than the rest, one corner of said sheet of glass engages the stop 48 and the outer free end of the rest approaches the travelling base 44 and as shown herein, for purposes of illustration, the rest 25 will accommodate a piece of glass 19 inches long and if said rest is swung downward until it meets the travelling base, the outer free end of said rest will be at the indication mark representing 19 inches on the scale 47.

In actual practice, when it is desired to cut a sheet or light of glass, the straightedge 30 is pulled away from the upright, as shown in Fig. 4, by gripping the handle 39, and the sheet of glass inserted between said upright and the straightedge and the latter then closed against the glass.

Assuming that the piece of glass required is longer than the rest 25, the stop 48 is positioned to the predetermined designation mark on the scale 46. As the upright swings over, the glass is adjusted to engage said stop 48 at which time the straightedge will be in proper position for making a cut at right angles to the lower edge of the glass. After the glass has been scored by running a glass cutter over the glass, using the straightedge 30 as a guide for the cutter, the overhanging part of the glass is broken off, while the measured piece is retained by the clamping action of the straightedge. The measured piece of glass can then be removed by pulling the straightedge away from the glass and the spring will return the upright and component parts to their normal positions.

A very important feature of the present invention is that the glass engages a very small area of the rest 25 and can be easily inserted and removed without the corners of the glass contacting said rest to scratch it and get the parts out of plumb, which does happen in most if not all other devices of this general character.

Of course I do not wish to be limited to the exact details of construction herein shown and described, as these may be varied within the scope of the appended claims without departing from the spirit of my invention.

Having described my invention, what I claim as new and useful is:

1. A glass cutting guide comprising a bracket, an upright pivoted adjacent its lower end to said bracket for lateral swinging movements, means to urge said upright towards a vertical position, means to limit the movements of the upright, a rest fixed to the lower portion of said upright and extending crosswise thereof, and a straightedge hinged for parallel movements relative to the upright above the rest.

2. The structure in claim 1, in combination with a travelling base, and means to connect the rest with said base to move the latter endwise as the former swings up and down.

3. A glass cutting guide comprising an angle bracket, one leg of which is to be attached to a support in a horizontal position with the other leg projecting upwardly in a vertical position, an upright pivoted adjacent its lower end to the vertical leg of the bracket, said vertical leg having an arcuate slot in which every part of its longitudinal center is equidistant from the pivot point of the upright, means carried by the upright and registering with said slot for limiting the movements of the upright and holding the latter in any adjusted position, a spring to normally maintain the upright in a perpendicular position, an angular rest fixed to the front face of said upright by the vertical leg the edge of which tapers to a point at the inner end, a straightedge imposed on the front face of the upright and having a lateral offset at its lower end opposite the guiding edge, an extension projecting from the lower main portion of the straightedge to a position adjacent the rest and acting as a continuation of the guiding edge, the horizontal leg of the rest having an opening in alignment with the guilding edge, a double acting hinge to connect the lower end of the straightedge near the bottom of the upright, a double acting hinge having one leaf connected to the upper end of the straightedge and the uppermost leaf of said last named hinge having a transverse slot, means on the upright and registering with said transverse slot to hold said straightedge in an adjusted position, a handle on the straightedge for actuating the same, a plate adjustably mounted on the back of the rest, spaced rollers on said plate, a post having its edges converging towards the lower end and mounted between said rollers, a travelling base attached to said post, rollers on which the travelling base is mounted, said travelling base, rest and upright having scales thereon representing linear measurement, and a stop adjustably mounted on the travelling base.

4. The structure in claim 3 wherein the innermost leaf of the top hinge has longitudinal slots for registration with pins on the upper end of the straightedge to limit movements of the straightedge and top hinge relative to one another.

5. A glass cutting guide comprising a bracket, an upright pivoted adjacent its lower end to said bracket for lateral swinging movements, said upright having a scale thereon representing linear measurement, a rest fixed to the lower portion of said upright and extending crosswise thereof, and a straightedge hinged for parallel movements relative to the upright above the rest.

6. The structure in claim 5, in combination with a travelling base connected with the rest so that said base moves endwise as the rest swings up and down, said base having a scale thereon representing linear measurement, and a stop adjustably mounted on the travelling base.

JOSEPH LEVIN.